United States Patent [19]
Goebel

[11] Patent Number: 6,135,650
[45] Date of Patent: *Oct. 24, 2000

[54] METHOD AND SYSTEM FOR WRAPPER ROUTINE OPTIMIZATION

[75] Inventor: Kurt J. Goebel, Mountain View, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,029

[22] Filed: Dec. 22, 1995

[51] Int. Cl.$^7$ ........................................................ G06F 9/45

[52] U.S. Cl. ............................................................... 395/708

[58] Field of Search ........................................ 395/708, 709, 395/707, 705, 702

[56] References Cited

U.S. PATENT DOCUMENTS

| | | | |
|---|---|---|---|
| 4,571,678 | 2/1986 | Chaitin . | |
| 4,667,290 | 5/1987 | Goss et al. . | |
| 4,763,255 | 8/1988 | Hopkins et al. . | |
| 4,782,444 | 11/1988 | Munshi et al. . | |
| 5,175,856 | 12/1992 | Van Dyke et al . | |
| 5,233,691 | 8/1993 | Ando et al. | 395/250 |
| 5,249,295 | 9/1993 | Briggs et al. . | |
| 5,418,958 | 5/1995 | Goebel . | |
| 5,481,706 | 1/1996 | Peek | 395/726 |
| 5,530,866 | 6/1996 | Koblenz et al. . | |
| 5,590,329 | 12/1996 | Goodnow et al. | 395/708 |
| 5,590,332 | 12/1996 | Baker | 395/705 |
| 5,659,754 | 8/1997 | Grove et al. . | |
| 5,734,908 | 3/1998 | Chan et al. | 395/709 |
| 5,752,034 | 5/1998 | Srivastava et al. | 395/704 |
| 5,815,719 | 9/1998 | Goebel | 395/707 |

FOREIGN PATENT DOCUMENTS 0 051 131   5/1982   European Pat. Off. .

OTHER PUBLICATIONS

Book: *Compilers Principles, Techniques, and Tools*, Authors: Afred V. Aho, Ravi Sethi and Jeffrey D. Ullman, Publisher: Addison–Wesley, Printed: Mar. 1988, Chapter 8—Intermediate Code Generation, pp.: 463–512.

(List continued on next page.)

*Primary Examiner*—Majid A. Banankhah
*Assistant Examiner*—Sue Lao
*Attorney, Agent, or Firm*—Graham & James LLP

[57] ABSTRACT

Program routines normally requiring windowed register allocation using conventional assembly code generation in a compiler are examined for eligibility for a wrapper routine optimization procedure in which wrapper routine assembly code instructions are generated in response to the application of high level programming language instructions specifying routines. If not eligible, the compiler generates assembly code instructions in a conventional way, allocating windowed registers to each routine. If the routine is eligible for wrapper routine optimization, the routine is further examined to determine whether the routine includes tail routine calls only or calls within the body of the routine. If the former, the routine is examined to determine whether local stack usage is required. For a routine having tail routine calls only and a requirement of local stack usage, wrapper routine assembly code instructions of a first type are generated. If the routine includes tail calls only and no requirement for local storage, wrapper routine assembly code instructions of a second type are generated. If the routine incorporates one or more calls within the body thereof, the routine is further examined to determine whether a live register is required over any of the calls. If so, wrapper routine assembly code instructions of a third type are generated. If the routine incorporates calls within the body thereof and a live register is not required over any call, wrapper routine assembly code instructions of a fourth type are generated.

15 Claims, 3 Drawing Sheets

OTHER PUBLICATIONS

David L. Weaver et al., "The SPARC Architecture Manual," Prentice Hall, (1994) Version 9, pp. 294–298.

Book: *Computer Languages vol. 6*. Article: "Register Allocation Via Coloring", Author(s): Gregory J. Chaitin, Marc A. Auslander, Ashok K. Chandra, John Cooke, Martin E. Hopkins and Peter W. Markstein. Publisher: Pergamon Press Ltd., Printed: 1981, pp.: 47 –57.

Book: *ACM Transactions on Programming Languages and Systems, Vol. 12 No. 4* Article: The Priority–Based Coloring Approach to Register Allocation. Author(s): Fred C. Chow and John L. Hennessy, Printed: Oct. 1990, pp.: 501 –536.

Publication: *IEEE*, Article: "Diriect Synthesis of Optimized DSP Assembly Code From Signal Flow Block Diagrams", Author(s): Douglas B. Powell, Edward A. Lee and William C. Newman, Printed: 1992, pp.: V–553–V–556.

Article: "Optimizing Compiler Exploits DSP Features", Section: Software Developments, Author(s): Ronald E. Kole, Published By: High Performance Systems, Date Published: Feb. 11, 1990, pp.: 40 –42 and 44 –45.

Publication *iEEE*, Article "GEM Optimizing Compilers for Alpha AXP Systems", Author(s): R. B. Grove, D. S. Blickstein, K. D. Glossop and W. B. Noyce, Date Published Feb. 22, 1993, pp.: 465 –473.

METHOD AND SYSTEM FOR WRAPPER ROUTINE OPTIMIZATION

BACKGROUND OF THE INVENTION

This invention relates to the field of computer systems in general, and in particular to programming language compilers used on such computer systems. More specifically, the invention relates to a technique for optimizing the use of register windows in a windowed register architecture.

Computer systems are known which employ a windowed register architecture. In such an architecture, registers are grouped into a plurality of windows for each procedure, with each window having a fixed number of registers. As an example, in the SPARC-V9 architecture, each window includes a fixed number of registers (four groups of eight), grouped as in registers, local registers and out registers. The in and out registers are used primarily for passing parameters to and receiving results from subroutines, and for keeping track of the memory stack. A procedure may store temporary values in its out registers, and up to six parameters may be passed by placing them in the out registers. Typically, when a procedure is called and executes a SAVE instruction, the out registers allocated to the calling procedure become the in registers of the called procedure. When a register file overflows, one of the procedure out registers is used as a stack pointer and points to an area in a memory stack in which the system can store parameters or results until the overflow condition is alleviated. This stack pointer is also used to address most values located on the stack. Local registers are used for automatic variables, i.e., a local variable whose life time is no longer than that of its containing procedure, and for most temporary values. In addition to the windowed in, out and local registers, a set of global registers is also provided. The global registers are typically used for temporary values, global variables or global pointers—either user variables, or values maintained as part of a program's executive environment. In addition to the global registers, a set of floating-point registers is also provided for storing user variable and compiler temporaries and for other purposes. For a detailed discussion of additional software considerations of the SPARC-V9 architecture reference may be had to Appendix H of the SPARC Architecture Manual, Version 9, PTR Prentice Hall, Englewood Cliffs, N.J., the disclosure of which is hereby incorporated by reference.

Regardless of how many register windows are implemented by a given implementation, the number of register windows utilized by code written for a windowed register architecture may easily exceed the available number of windows. When this occurs, the contents of one or more register windows must be saved to the memory stack so that the execution of the procedure can proceed. As a consequence, it is frequently necessary to later restore the saved register window or windows.

The saving and restoring of register windows is traditionally handled within the operating system running on top of the compiler implementation. When it is necessary to save and restore register window(s), the operating system must be alerted to a register window overflow or underflow (i.e., the need to save or restore), and the handling of the register window condition and the subsequent save and restore operations require a substantial amount of run time, which expands the overall run time required for the program.

SUMMARY OF THE INVENTION

The invention comprises a method and system for reducing the occurrence of window use overflow by transforming normal routines into a class of routines termed wrapper routines which do not utilize a register window and are therefore not susceptible to invoking a register window spill/fill.

From a process standpoint, the invention comprises a method of generating wrapper routine assembly code instructions for executing routines specified by a high level programming language with reduced run time costs, the routines normally requiring windowed register allocation and being subject to windowed register overflow/underflow conditions. The method includes the steps of classifying a given routine into one of a plurality of types of wrapper routines, and generating wrapper routine assembly code instructions in accordance with the type of wrapper routine classified. During the step of classifying, a given routine is examined to determine whether it is eligible for the wrapper routine code generation process and, if not, assembly code instructions are generated for the given routine using conventional code generation.

During the step of classifying, the routine is examined to determine whether the given routine incorporates tail routine calls only, where tail routine calls are routine calls which occur just prior to the routine exit. If the given routine includes tail calls only, the routine is further examined to determine whether the given routine requires local stack usage. If local stack usage is required, wrapper routine assembly code instructions of a first type are generated: if local stack usage is not required by the given routine, wrapper routine assembly code instructions of a second type are generated.

If the classifying step results in a determination that one or more calls within the body of the given routine are required, the routine is further examined to determine whether the given routine requires a live register over a routine call. If a live register is required, wrapper routine assembly code instructions of a third type are generated: if a live register is not required, wrapper routine assembly code instructions of a fourth type are generated.

From an apparatus standpoint, the invention comprises a compiler for generating wrapper routine assembly code instructions for executing routines specified by high level program language, with reduced run time costs, the routines normally requiring allocation of windowed registers and being subject to windowed register overflow/underflow conditions. The compiler includes a first procedure for classifying a given routine into one of a plurality of types of wrapper routines, and a second procedure for generating wrapper routine assembly code instructions in accordance with the type of wrapper routine classified by the first procedure. The first procedure further includes a procedure for determining whether a given routine is eligible for the second procedure and, if not, a third procedure is provided for generating assembly code instructions for the given routine using conventional code generation.

The first procedure includes a procedure for determining whether the given routine incorporates tail routine calls only and, if so, a procedure for determining whether the given routine requires local stack usage. If the given routine incorporates tail routine calls only and requires local stack usage, the second procedure generates wrapper routine assembly code instructions of a first type. If the given procedure incorporates tail routine calls only and does not require local stack usage, the second procedure generates wrapper routine assembly code instructions of a second type.

The first procedure also includes a procedure for determining whether a given routine incorporates calls within the body of the given routine and, if so, whether the given routine requires a live register over any routine call. If the given routine includes calls within the body thereof and requires a live register over at least one routine call, the second procedure generates wrapper routine assembly code instructions of a third type; if the given routine includes calls within the body thereof and does not require a live register over any routine call, the second procedure generates wrapper routine assembly code instructions of a fourth type.

The invention permits eligible routines to be coded and executed without the need for allocating windowed registers to the routine. This reduction in the allocation of windowed registers reduces the likelihood of occurrence of windowed register overflow conditions, which reduces the execution time for a given set of routines.

For a fuller understanding of the nature and advantages of the invention, reference should be made to the ensuing detailed description, taken in conjunction with the accompanying drawings.

DETAILED DESCRIPTION OF THE PREFERRED EMBODIMENTS

Figure 1:
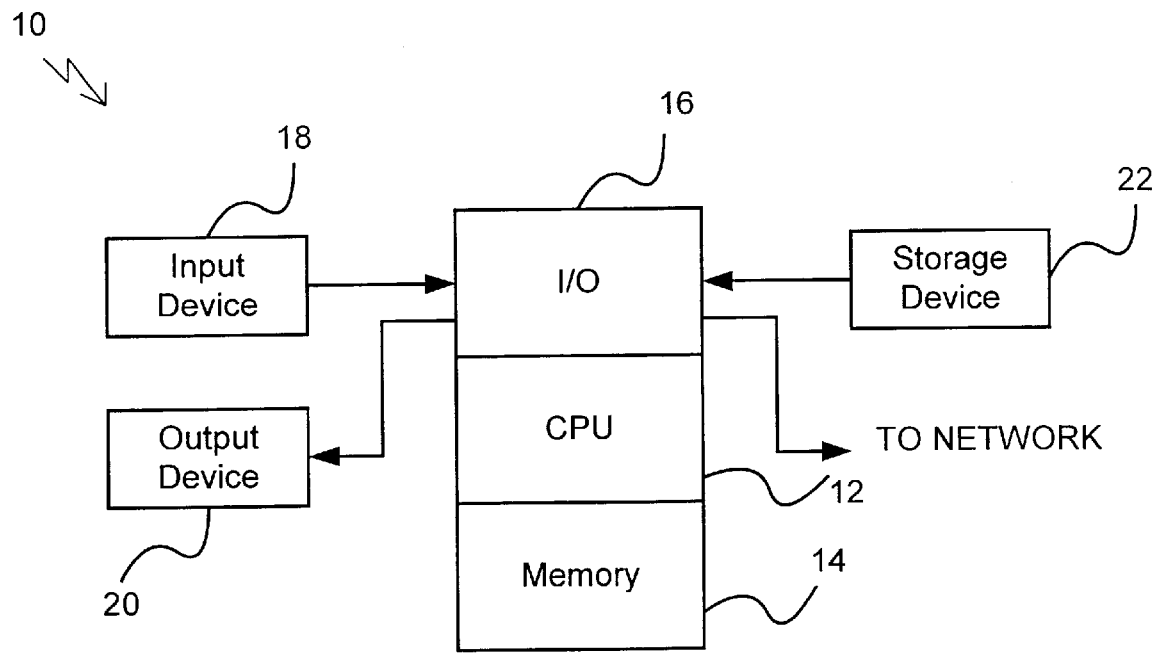
FIG. 1 is a system block diagram of a computer system incorporating the invention.

Turning now to the drawings, FIG. 1 is a block diagram of a computer 10 comprising a central processor unit (CPU) 12, a memory 14, and an I/O module 16. Computer system 10 further includes an input device 18, an output device 20 and a storage device 22. CPU 12 is coupled to memory 14 and I/O module 16. Input device 18, output 20, and storage device 22 are coupled to I/O module 16. I/O module 16 is coupled to a network.

CPU 12, memory 14, I/O module 16, input device 18, output device 20 and storage device 22 may comprise any one of a wide variety of such elements found in most computer systems. Since such elements are well known, they will not be further described in order to avoid prolixity.

Figure 2:
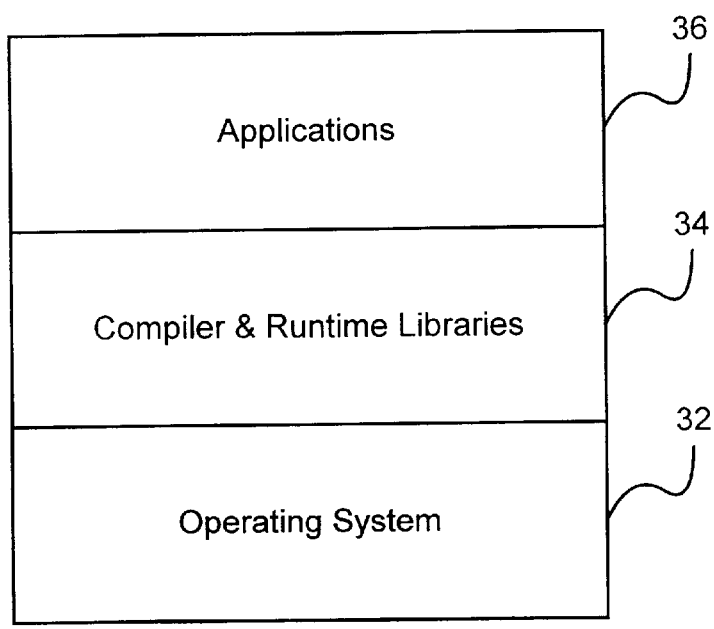
FIG. 2 is a schematic diagram of the software associated to the computer system of FIG. 1.

FIG. 2 is a block diagram of the software components used in conjunction with the computer system of FIG. 1 to implement the invention. As seen in FIG. 2, the software includes a compiler and the associated run time libraries designated with reference numeral 34, an operating system 32 which provides system services to the compiler and the run time libraries, and a group of application programs 36 which are also serviced by the operating system 32. Application programs 36 may comprise a broad variety of application programs found in many computer systems. The run time libraries 34 and the operating system 32 are also intended to represent a broad category of software elements found in a wide variety of computer systems and are therefore not described in any further detail.

Figure 3:
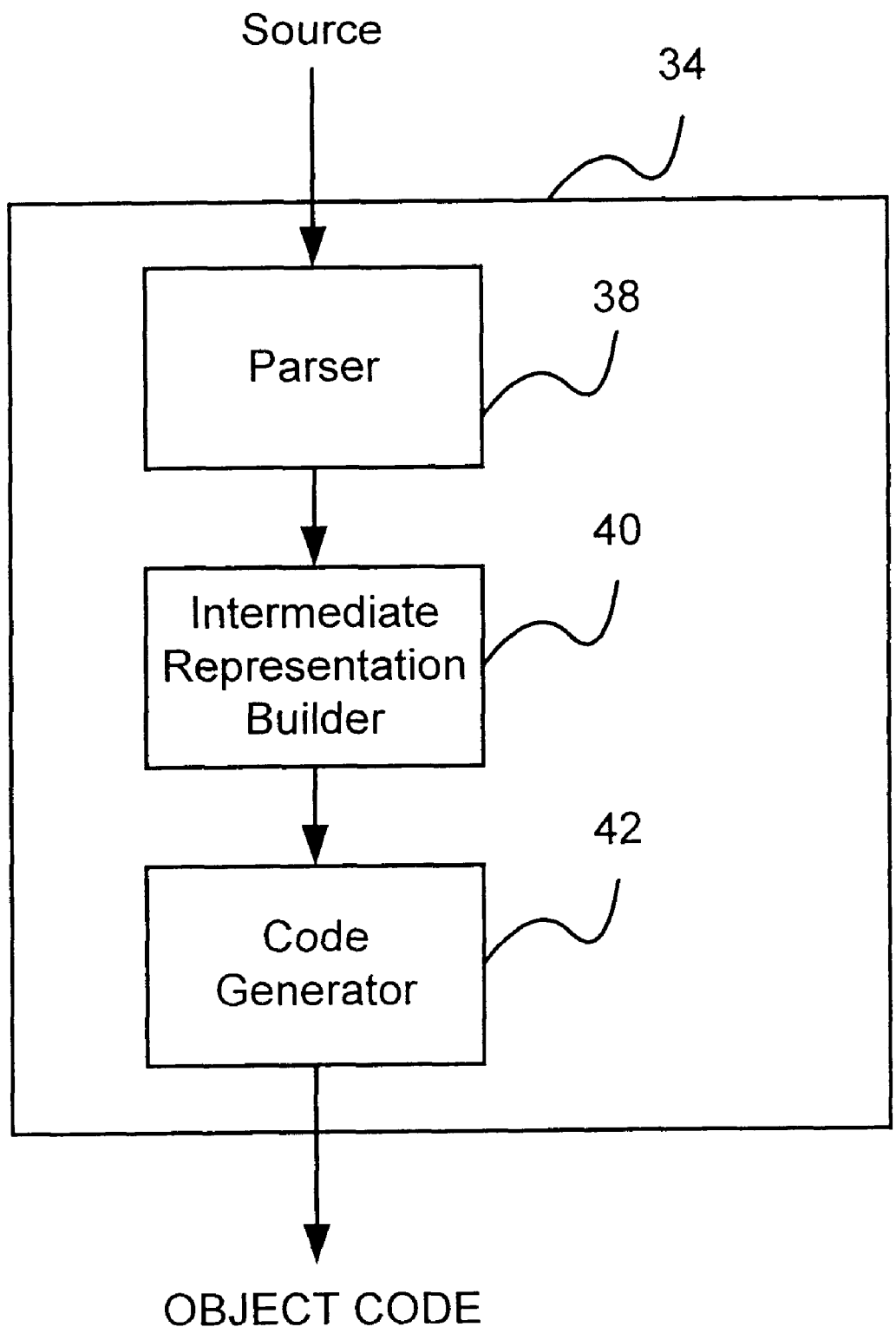
FIG. 3 is a schematic diagram of the compiler and run time libraries portion of the software of FIG. 2.

With reference to FIG. 3, language compiler and run time libraries 34 include a parser portion 38, an intermediate representation builder 40, and an assembly code generator 42 incorporating the teachings of the present invention. Elements 38, 40 and 42 cooperate to generate assembly code in response to received high level source code. More specifically, parser 38 receives application source code as inputs, and tokenizes the various expressions in the source code. The intermediate representation builder 40 receives the tokenized expressions and generates intermediate representations for these expressions. Code generator 42 receives the intermediate representations and generates executable code as well as performs register allocation. For a further description of various parsers, intermediate representation builders, and code generators, reference may be had to A. V. Aho and J. D. Ullman "Compiler Principles, Techniques and Tools", Addison-Wesley, 1985, pages 146–388 and 463–584.

As noted above, when the number of register windows utilized by code written for a given architecture using windowed registers exceeds the available number of windows, it is necessary to save the contents of one or more register windows so that execution of the program can proceed. As a consequence, it is often necessary to later restore the saved register window or windows. The saving and restoring of register windows is traditionally handled within the operating system running on top of the compiler implementation. The process of alerting the operating system of a register window overflow or underflow (signifying the need to save or restore register information), the handling of the register window condition, and subsequent save and restore operations amount to a substantial run time cost to programs requiring the operating system support. An example of a sample routine illustrating the problem of register window overflows and underflows, written in the C programming language, is as follows:

```
void
potential_overflow_causing_routine()
{
    external_routine_a();
}
```
The corresponding conventional SPARC assembly code is as follows:
```
potential_overflow_causing_routine:
    save      %sp,-96,%sp
    call      external_routine_a,0
    nop
    ret
    restore   %g0,%g0,%g0
```

As can be seen, this routine includes a save instruction: execution of this save instruction allocates a register window for this routine. If all the implemented register windows are utilized at this time, this will cause a register window overflow. The called routine will likely allocate another register window, which may also cause a register window overflow. Further, if register window overflows have already taken place, then it is possible that the execution of the restore instruction will cause a register window underflow.

Figure 4:
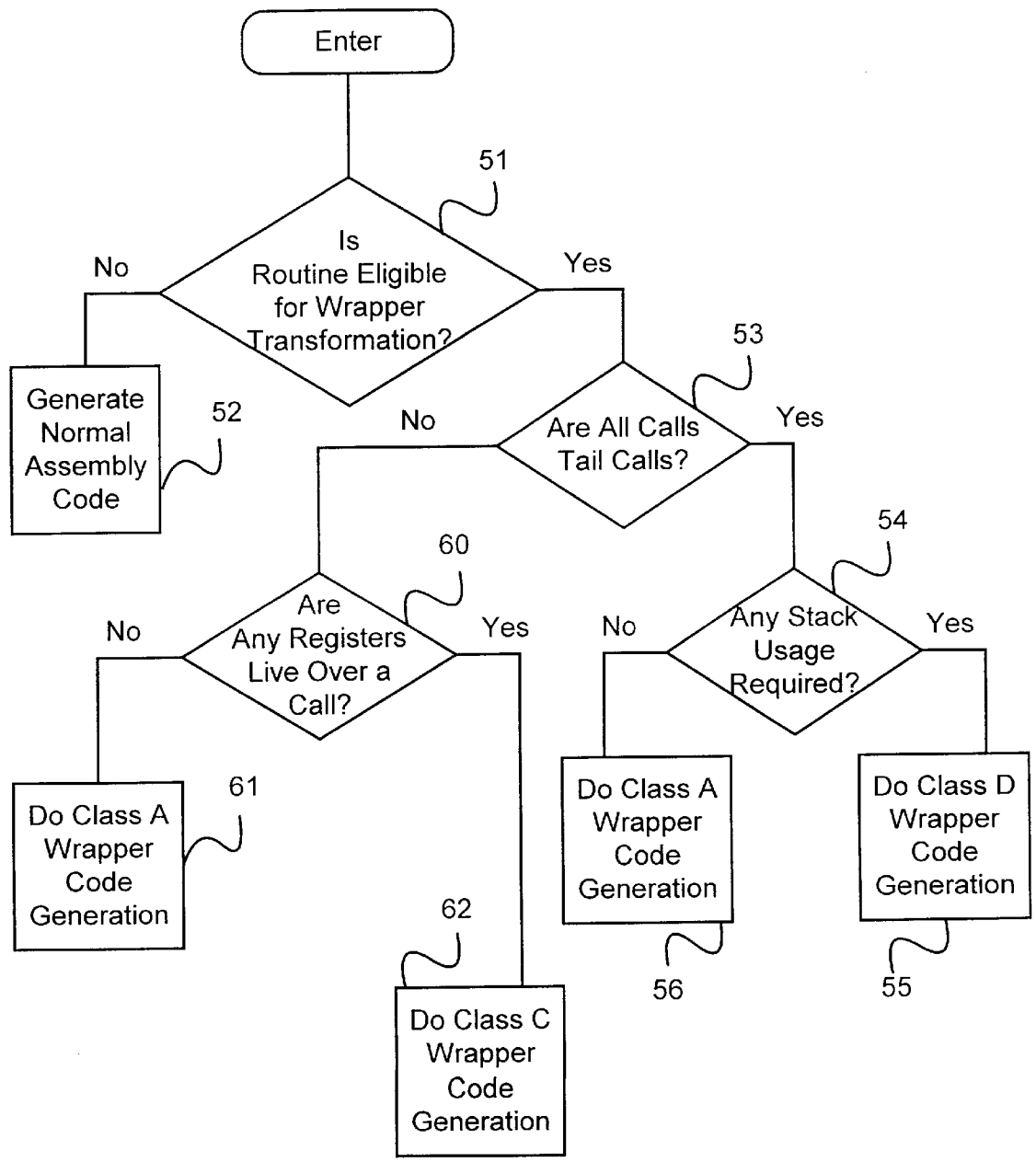
FIG. 4 is a flow diagram illustrating the invention.

FIG. 4 is a flow diagram illustrating the method of the present invention for selecting a routine for wrapper routine transformation and for classifying a selected routine into one of four wrapper classes designated herein as Classes A, B, C and D. The characteristics of each class are set forth with more particularity below.

A wrapper routine may be defined as a routine which resides at any point within the call graph of a given program, and one which does not require the use of a register window (and is consequently not susceptible to invoking a register window spill/fill). The wrapper routine optimization process according to the invention proceeds as follows. The stack pointer (% sp) and frame pointer (% fp) registers are implemented on a given register window in such a way that the overlap of each register window onto the next allocated register window renames the frame pointer of the previous register window to the stack pointer of the new register window. Converting a given routine into a wrapper routine by optimizing away the register window makes it necessary to either determine that this operation is not necessary or to implement the operation with explicit assembly language instructions.

The four classes of wrapper routines are as follows. A Class A wrapper routine is one in which all calls are tail routine calls and use of the (memory) stack is not required. A tail routine call is one which occurs just prior to routine exit. A Class B wrapper routine is one in which not all calls are tail routine calls (i.e., there are calls within the body of the routines) and no live registers are required anywhere within the routine. A Class C wrapper routine is one in which not all calls are tail routine calls and a live register is required over one of the calls somewhere in the routine. A Class D wrapper routine is one in which all calls are tail routine calls and stack usage is required somewhere within the routine. Specific examples of each class of wrapper routine are given below.

At the beginning of the method illustrated in FIG. 4, the routine is examined in its entirety to determine whether the routine is eligible for wrapper transformation. In general, a routine is ineligible for wrapper transformation if converting the routine to a wrapper routine would invariably result in a greater number of store and load operations to and from storage device 22 than simply coding the routine using the normal assembly code generation process. The types of routines which are ineligible for wrapper transformation are largely dependent upon the nature of the routines defined in the high level programming language. One example of a routine which is not eligible for wrapper transformation is the C library routine termed alloca. Calls to this routine cause storage to be allocated on the run time stack of the calling routine. This is commonly done in a SPARC implementation by adjusting the stack pointer register % sp. Since the wrapper routine implementation described in detail below optimizes away the implicit restore instruction function of automatically restoring the stack pointer to its previous value, it would be necessary to save the size of each alloca allocated segment of memory, so that the stack pointer could be explicitly restored prior to routine exit. Since this would inevitably increase the run time of the routine, the alloca routine is deemed ineligible for wrapper transformation and is subjected to the normal assembly code generation process. Another case in which Class B and Class C wrapper routines should be avoided occurs when a given high level compilation and run time system implies that during execution of a program, the language run time system may need to walk back up the stack in a manner other than the normal routine exit. Such a situation typically exists in a C++ run time system when an exception is raised and propagated back to several routine levels. This propagation is normally implemented in such a manner that the output register % o7 must be set at all times to the correct return address. In the case of Class B and Class C wrapper routines defined herein, this is not the case. Another common example of a run time system walking back through routines is a run time debugger. It should be noted that the wrapper routine optimization procedure can be modified, if desired, to handle both the exception and the run time debugger example just noted. In each case, an extension of the wrapper routine optimization can be implemented to save the return address of a routine in a canonical location from which a smart language run time system or a smart run time debugger could retrieve it. However, this extension is beyond the scope of this disclosure.

If the routine is eligible for wrapper routine optimization, it is then subjected to a classification process to determine which of the four classes the routine falls into. The preferred method of performing the classification commences with an examination of the calls within the routine. If all the calls are tail calls, then the routine is either a Class A or a Class D wrapper routine. If not, the routine is either a Class B or a Class C wrapper routine. If the determination in decision diamond 53 is yes, then the routine is further examined to determine whether any stack usage is required within the routine. If so, the routine is a Class D routine and is subject to Class D wrapper code generation in code generator 42. If no stack usage is required, then the routine is a Class A routine and is subjected to Class A wrapper code generation in code generator 42.

If the result from decision diamond 53 indicates that not all calls are tail calls, then the routine is examined to determine whether at least one live register is required over a call somewhere within the routine. If not, the routine is a Class B routine and is subjected to Class B wrapper code generation in code generator 42. If at least one live register is required over a call, the routine is a Class C routine and is subjected to Class C wrapper code generation in code generator 42. The following are some specific examples of wrapper routine code generation for each of the four classes of wrapper routines.

Class A wrapper routines are routines which include only tail routine calls. Tail routine calls are routine calls which occur just prior to routine exit. These calls are commonly made in, or just prior to, explicit or implicit routine exit statements (e.g. C, return b ( );). Class A wrapper routines also never utilize local stack storage. The following is an example of a Class A wrapper routine written in the C programming language:

```
void
class_a()
{
    external_routine_a();
}
The corresponding assembly code for a SPARC implementation is:
    .global class_a
class_a:
    or    %g0,o7,%g1
    call  external_routine_a,0      ! Result = %g0  ! (tail call)
    or    %g0,%g1,%o7
```

Class A wrapper routines never manipulate the stack pointer % sp or the frame pointer % fp. The return address for the routine is copied from the calling routine's output register % o7 into a global temporary register % g1 before the call. In the delay slot of the call, the return address is copied from global register % g1 into the return address register of the called routine, viz. windowed output register % o7. The called routine thus returns directly to the routine which called the wrapper routine instead of the wrapper routine itself.

Class A wrapper routines involve no additional run time costs. This transformation eliminates the execution of the save and restore instruction required with conventional assembly code generation and the potential associated windowed register overflows and underflows. Note that there is no need to execute a return ("ret") statement since the called routine (or some other routine down the call chain) will execute a "ret" instruction which will cause a jump back to the return address of the wrapper routine without the need to keep any register live over any call.

Class B wrapper routines are routines which include at least one call within the body of the routine, but which do not require that a register be kept live over the call(s). The following is an example of a Class B wrapper routine written in the C programming language:

```
void
class_b()
{
        external_routine_a();
        external_routine_b();
}
```

The corresponding wrapper routine assembly code for a SPARC implementation is:

```
class_b:
        add     %sp,-96,%sp
        st      %o7,[%sp+92]
        call    external_routine_a,0
        nop
        ld      [%sp+92],%g1
        add     %sp,96,%sp
        call    external_routine_b,0
        or      %g0,%g1,%o7
```

This example of a Class B routine is similar to the Class A routine described above in that the last call is identified as a tail call so that the return address of the called routine is set to return not to the wrapper routine but to the routine which called the wrapper routine. Unlike the Class A example, the Class B example requires a temporary local stack in order to save the return address of the wrapper routine over the first call, since all general physical registers are volatile over the call. This save of the return address of the wrapper routine is performed with the instruction "st % o7,[% sp+92]". This saved return address is later restored using the instruction "ld [% sp+92], % g1". Because local stack storage is utilized in a Class B wrapper routine, it is necessary to manipulate the stack pointer % sp. Note that the save instruction normally found with conventional generated code has been replaced with an add instruction and a store instruction; while the restore instruction has been replaced with a load and an add instruction. If the save and restore instruction would have caused an overflow/underflow, then run time processing will be saved using the Class B wrapper routine optimization procedure. On the other hand, if no overflow or underflow would have resulted from the replaced save and restore, then it is likely that the add/store and the load/add instructions in the wrapper routine transformation will take longer to execute than the save/restore combination used during normal code processing.

Class C wrapper routines are identified by calls within the body of the routine, with at least one register live over at least one of these calls. A sample of a Class C wrapper routine written in the C programming language is as follows:

```
void
class_c(
        int a)
{
        external_routine_a();
        external_routine_b(a);
}
```

The corresponding wrapper routine assembly code in a SPARC implementation is as follows:

```
class_c:
        add     %sp,-104,%sp
        st      %o7,[%sp+96]
        call    external_routine_a,0
        st      %o0,[%sp+92]
        ld      [%sp+92],%o0
        ld      [%sp+96],%g1
        add     %sp,104,%sp
        call    external_routine_b,1
        or      %g0,%g1,%o7
```

This example of a Class C routine is similar to the Class A routine example described above in that the last call is identified as a tail call, so that the return address of the called routine is set to return not to the wrapper routine, but to the routine which called the wrapper routine. This example is also similar to the Class B routine since the return address of the routine must be saved and then restored from the local stack. However, because the argument a is live over the first call, it is necessary that the argument also be saved before the first call and subsequently before the second call, which takes its values as an argument.

The run time cost considerations associated with the Class C wrapper routine are similar to those of the Class B wrapper routines. There is added cost in the form of the store and load of the variable a. This added cost makes it even more likely that this transformation will run slower than the normal save/restore combination, if the normal save/restore combination results in no windowed register overflow/underflow.

Class D wrapper routines include only tail routine calls. Unlike Class A wrapper routines, a Class D wrapper routine also requires the usage of local stack storage. An example of a Class D wrapper routine written in the C programming language is as follows:

```
void
class_d(
        float a)
{
        external_routine_a((int)a);
}
```

The corresponding wrapper routine assembly code for a SPARC implementation is as follows:

```
class_d:
        add     %sp,-96,%sp
        or      %g0,%o7,%g1
        st      %o0,[%sp+164]
        ld      [%sp+164],%fl
```

-continued

```
fstoi    %f1,%f0
st       %f0,[%sp+92]
ld       [%sp+92],%o0
add      %sp,96,%sp
call     external_routine_a,1
or       %g0,%g1,%o7
```

As noted, this routine is similar to the Class A routine in that the last call is identified as a tail call so that the return address of the called routine is set to return not to the wrapper routine, but to the routine which called the wrapper routine. This routine differs from a Class A routine in that it requires the usage of local stack storage in order to move the converted floating point value into the argument register in preparation for the call.

The run time costs associated with a Class D wrapper routine are not as great as those for the Class B and Class C wrapper routines. There is no need to save the return address, and the save and restore instructions used in conventional assembly code are replaced with two add instructions. A Class D wrapper routine should execute as fast in the no overflow/underflow case as the normal save/restore combination, and much faster if there is an overflow/underflow resulting from execution of the normal save/restore combination.

As will now be apparent, the invention provides an improvement in the run time execution of routines in windowed register applications. In particular, the Class A and Class D routines always result in faster execution times by eliminating the need to store and load register contents between memory 14 and storage device 22 under windowed register overflow/underflow conditions. Further, for many routines which result in the requirement for a save and restore combination of instructions according to conventional processing and which result in windowed register overflow/underflow conditions, the Class B and Class C wrapper routines afford faster execution time, and therefore less run time cost.

While the above provides a full and complete disclosure of the preferred embodiments of the invention, various modifications, alternate constructions and equivalents may be employed, as desired. For example, while the invention has been described with reference to the C high level programming language, use with other high level programming languages is contemplated. Similarly, while the specific examples of Class A–D wrapper routines have been chosen from the SPARC implementation, other compiler implementations may be employed, as desired. Therefore, the above description and illustrations should not be construed as limiting the scope of the invention, which is defined by the appended claims.

What is claimed is:

1. A method of generating wrapper routine assembly code instructions for executing routines specified by a high level programming language, said routines normally requiring windowed register allocation, said method comprising the steps of:
   (a) identifying a routine that is eligible for having wrapper routine assembly code instructions generated therefor;
   (b) classifying the eligible routine identified in step (a) into one of a plurality of types of wrapper routines, wherein said step (b) of classifying includes the step (i) of determining whether the eligible routine incorporates tail routine calls only, where tail routine calls are routine calls which occur just prior to the routine exit; and
   (c) generating wrapper routine assembly code instructions for the eligible routine identified in step (a) and in accordance with the type of wrapper routine classified in step (b), where execution of the wrapper routine assembly code instructions does not require use of a register window.

2. The method of claim 1 wherein said step (i) of determining is followed by a step (ii) of determining whether the eligible routine requires local stack usage whenever said step (i) of determining results in a determination of only tail routine calls within the eligible routine.

3. The method of claim 2 wherein said step (ii) of determining is followed by the alternative steps of:
   (A) generating wrapper routine assembly code instructions of a first type whenever local stack usage is deemed required by the eligible routine; or
   (B) generating wrapper routine assembly code instructions of a second type whenever local stack usage is deemed not required by the eligible routine.

4. The method of claim 1 wherein said step (i) of determining is followed by a step (iii) of determining whether the eligible routine requires a live register over a routine call whenever said step (i) of determining results in a determination of calls within the body of the eligible routine.

5. The method of claim 4 wherein said step (iii) of determining is followed by the alternative steps of:
   (C) generating wrapper routine assembly code instructions of a third type whenever a live register is deemed required over a routine call; or
   (D) generating wrapper routine assembly code instructions of a fourth type whenever a live register is deemed not required over a routine call.

6. A computer system having a compiler for generating wrapper routine assembly code instructions for executing routines in said computer system, said routines specified by a high level programming language and normally requiring allocation of windowed registers, said compiler comprising:
   a first procedure for identifying a routine that is eligible for having wrapper routine assembly code instructions generated therefor;
   a second procedure for classifying the eligible routine identified in the first procedure into one of a plurality of types of wrapper routines, wherein said second procedure includes a procedure for determining whether the eligible routine incorporates tail routine calls only, where tail routine calls are routine calls which occur just prior to the routine exit; and
   a third procedure for generating wrapper routine assembly code instructions for the eligible routine identified in step (a) and in accordance with the type of wrapper routine classified by the second procedure, where execution of the wrapper routine assembly code instructions does not require use of a register window.

7. The computer system of claim 6 wherein said second procedure further includes a procedure for determining whether the eligible routine requires local stack usage whenever a determination of tail routine calls only has been made.

8. The computer system of claim 7 wherein said third procedure further includes a procedure for generating wrapper routine assembly code instructions of a first type whenever local stack usage is deemed required by the eligible routine and for generating wrapper routine assembly code instructions of a second type whenever local stack usage is deemed not required by the eligible routine.

9. The computer system of claim 6, wherein said second procedure includes a procedure for determining whether the eligible routine requires a live register over a routine call whenever calls within the body of the eligible routine have been determined; and wherein said compiler further includes a fourth procedure for generating assembly code instructions for the routine using a conventional code generation technique whenever the routine is deemed ineligible for classification in the second procedure and for generating wrapper routine assembly code in the third procedure.

10. The computer system of claim 9 wherein said third procedure includes a procedure for generating wrapper routine assembly code instructions of a third type whenever a live register is deemed required over a routine call and generating wrapper routine assembly code instructions of a fourth type whenever a live register is deemed not required over a routine call.

11. A computer program product including:
 a computer usable medium having computer readable code embodied therein for generating wrapper routine assembly code instructions for executing routines in a computer system, said routines specified by a high level programming language and normally requiring allocation of windowed registers, the computer program product comprising:
  a first set of computer readable program code devices configured to cause a computer to effect identification of a routine that is eligible for having wrapper routine assembly code instructions generated therefor;
  a second set of computer readable program code devices configured to cause a computer to effect classification of the eligible routine identified by the first set of computer readable program code devices into one of a plurality of types of wrapper routines, wherein said second set of computer readable program code devices is configured to cause a computer to effect a determination whether the eligible routine incorporates tail routine calls only, where tail routine calls are routine calls which occur just prior to the routine exit; and
  a third set of computer readable program code devices configured to cause a computer to effect the generation of wrapper routine assembly code instructions for the eligible routine identified by the first set of computer readable program code devices and in accordance with the type of wrapper routine classified by said second set of computer readable program code devices, where execution of the wrapper routine assembly code instructions does not require use of a register window.

12. The computer program product of claim 11 wherein said second set of computer readable program code devices is configured to cause a computer to effect a determination whether the eligible routine requires local stack usage whenever a determination of tail routine calls only has been made.

13. The computer program product of claim 12 wherein said second set of computer readable program code devices is configured to cause a computer to effect generation of wrapper routine assembly code instructions of a first type whenever local stack usage is deemed required by the eligible routine and generation of wrapper routine assembly code instructions of a second type whenever local stack usage is deemed not required by the eligible routine.

14. The computer program product of claim 11,
 wherein said second set of computer readable program code devices is configured to cause a computer to effect a determination whether the eligible routine requires a live register over a routine call whenever calls within the body of the eligible routine have been determined; and
 wherein said computer program product further includes a fourth set of computer readable program code devices configured to cause a computer to effect generation of assembly code instructions for the given routine using a conventional code generation technique whenever a given routine is deemed ineligible for classification by said second set of computer readable program code devices and generation of wrapper routine assembly code by said third set of computer readable program code devices.

15. The computer program product of claim 14 wherein said third set of computer readable program code devices is configured to cause a computer to effect the generation of wrapper routine assembly code instructions of a third type whenever a live register is deemed required over a routine call and generation of wrapper routine assembly code instructions of a fourth type whenever a live register is deemed not required over a routine call.

* * * * *